Fig.3.

C. KNOTH.
ROLL WINDING MACHINE.
APPLICATION FILED AUG. 10, 1920.

1,394,095.

Patented Oct. 18, 1921.
9 SHEETS—SHEET 7.

INVENTOR.
Conrad Knoth, per
Thos. S. Crane, Atty.

C. KNOTH.
ROLL WINDING MACHINE.
APPLICATION FILED AUG. 10, 1920.

1,394,095.

Patented Oct. 18, 1921.

Inventor.
Conrad Knoth
per Thos. S. Crane, Atty.

C. KNOTH.
ROLL WINDING MACHINE.
APPLICATION FILED AUG. 10, 1920.

1,394,095.

Patented Oct. 18, 1921.

INVENTOR.
Conrad Knoth,
BY
Thos. S. Crane, Atty
ATTORNEYS.

UNITED STATES PATENT OFFICE.

CONRAD KNOTH, OF HILLSIDE, NEW JERSEY, ASSIGNOR TO HYATT BEARINGS DIVISION, GENERAL MOTORS CORPORATION, OF HARRISON, NEW JERSEY, A CORPORATION OF NEW YORK.

ROLL-WINDING MACHINE.

1,394,095.      Specification of Letters Patent.      Patented Oct. 18, 1921.

Application filed August 10, 1920. Serial No. 402,681.

*To all whom it may concern:*

Be it known that I, CONRAD KNOTH, a citizen of the United States, residing at 38 Mertz avenue, Hillside, county of Union, and State of New Jersey, have invented certain new and useful Improvements in Roll-Winding Machines, fully described and represented in the following specification and the accompanying drawings, forming a part of the same.

The present invention relates to a machine for winding a flat strip or strand of metal into adjacent coils to form rolls for use in roller-bearings.

A machine of this class is shown in U. S. Patent No. 587,582, issued to John W. Hyatt on the 3rd day of August, 1897, in which machine a rotating mandrel is, by means of a movable carriage, drawn between a pair of compression-rolls to which the strand of metal is supplied and bent upon the mandrel by the rolls.

Heretofore in machines of this class, the carriage has been moved by a long screw and the motion of the screw reversed to restore the carriage to its initial point after winding a strand upon the entire length of the mandrel.

In such machines, the head which contains the compression-rolls and levers to press them with any desired force upon the strand has been projected at right-angles to the side of the mandrel so as to leave a clear space at the opposite side for the introduction of the strand to the mandrel.

Such a machine can obviously wind the strand only in one direction, either right or left-hand, as the clear space to introduce the strand lies at only one side of the mandrel.

The clear space has in some machines been provided at the right-hand side of the mandrel, and in others at the left-hand side, and two entire machines were therefore required for winding rolls in the two directions.

Roller-bearings are frequently made in which such right and left-hand rolls are arranged alternately within the casing of the bearing to obviate any tendency of the rolls to work endwise, and the product of the two machines for winding right and left-hand coils must necessarily be equal to supply such bearings as described.

If either machine were disabled the other one was necessarily stopped to avoid overproduction of one kind of rolls.

In the present invention the carriage-feeding screw, which is a very expensive element of construction, is replaced by a rack and pinion, and the machine has the roll-forming head arranged in line with the mandrel instead of transverse to the same. It is thus intermediate to the two positions heretofore employed, leaving clear space for introducing the strand to the mandrel at either the right or left-hand side. Similar guides for leading the strand obliquely to the mandrel are provided in the clear space at both sides to direct the strands at a suitable inclination. The present machine can thus be used for winding right or left-hand coils, whichever are desired.

The carriage is provided with a chuck and mechanism for rotating the same, and such mechanism is made in the present invention of reversible character, so that the mandrel can be rotated to the right or left-hand, as may be desired.

In the present machine the carriage-feed is provided by a stationary rack and a pinion rotated upon the carriage to engage the same.

The carriage is preferably supplied with an electric motor to operate such gearing, and means is provided for varying the speed imparted to the mandrel, and to the gearing which feeds the carriage upon the bed of the machine.

Means is provided, accessible to the operator near the winding-head of the machine, for stopping or starting the carriage at any moment or reversing the direction of its motion. By these appliances the product of the machine is increased several fold and its cost very greatly reduced, while it is enabled to wind right or left-hand rolls which have heretofore required separate machines.

The invention will be understood by reference to the annexed drawing, in which Figure 1 is a side elevation, and Fig. 2 a plan, with many of the details (shown in other figures) omitted owing to the smallness of the scale. Fig. $2^a$ is a plan of the winding-head at the level of the mandrel; Fig. $2^b$ is a front elevation of the winding mechanism; Fig. $2^c$ is a perspective view of the removable retaining-roll; and Fig. $2^d$ is an elevation of the control-levers. Fig. 3 is a cross section on Fig. 1 adjacent to the left-hand end of the foot N; Fig. $3^a$ is a side elevation of the steady-rest and its fixtures as they are adjusted when in proximity to the winding-head D; Fig. $3^b$ is an elevation of the steady-rest and its fixtures when the steady-rest is elevated partly to its working position.

Figures 1, 2:
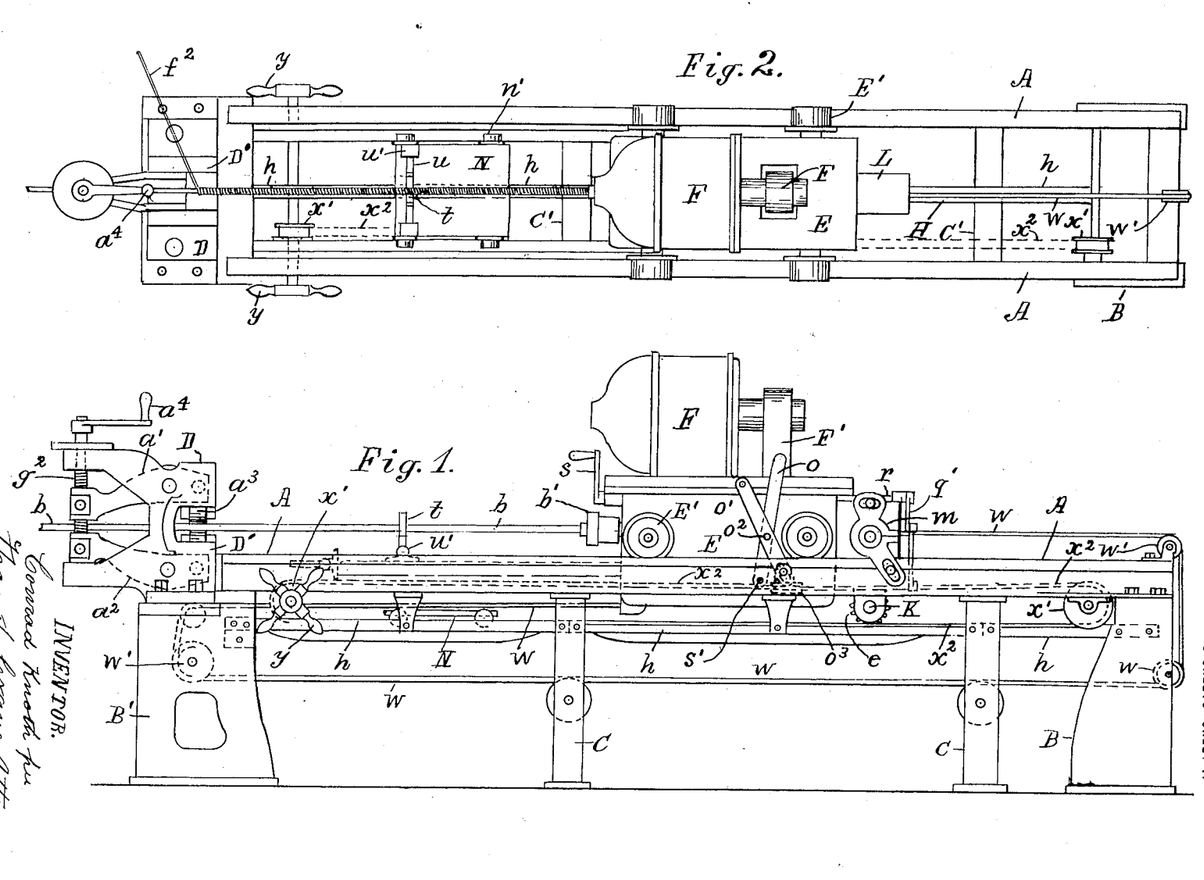
Figure 3:
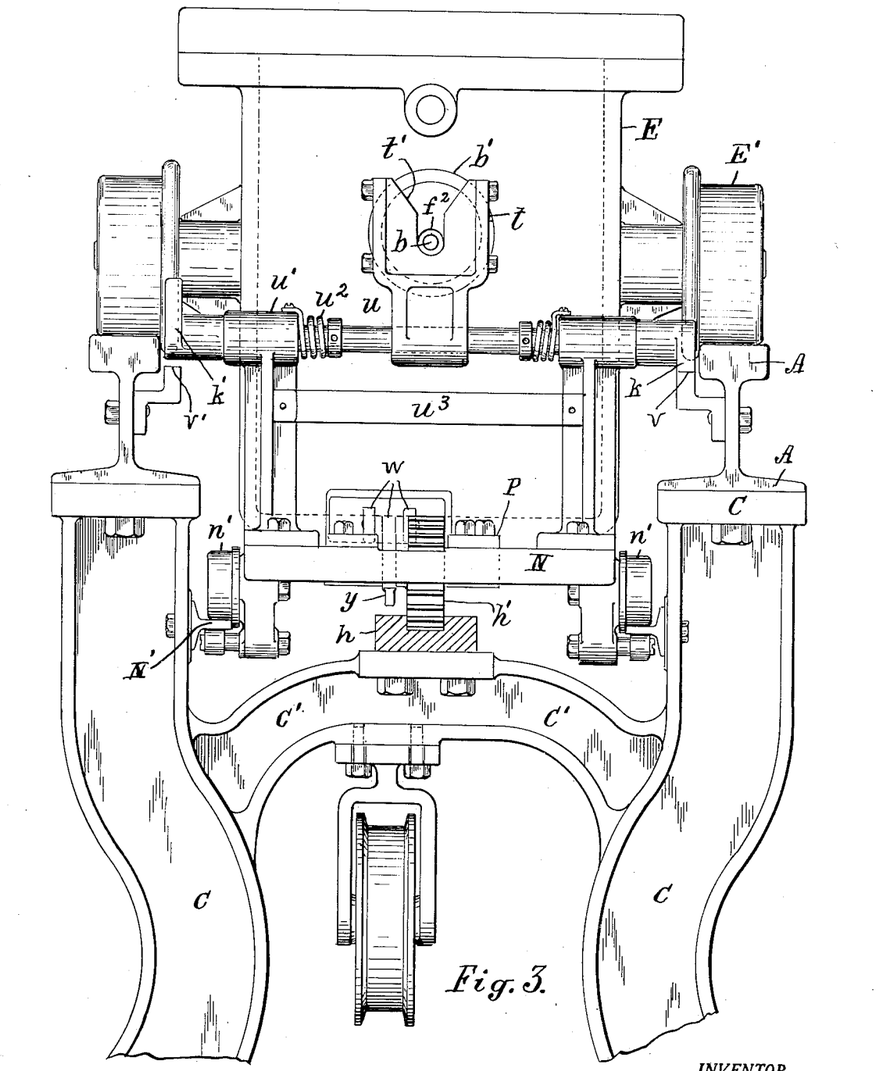

The frame of the machine as shown in Figs. 1 to 3 inclusive, is built of side-rails A, standards B and B', and intermediate legs C having cross-ties C'. (Figs. 1 and 3.)

*Winding-head.*

The winding-head as a whole is designated D, and is shown at the left-hand end of the frame over the standard B'.

Figures 2, 2A, 2D:
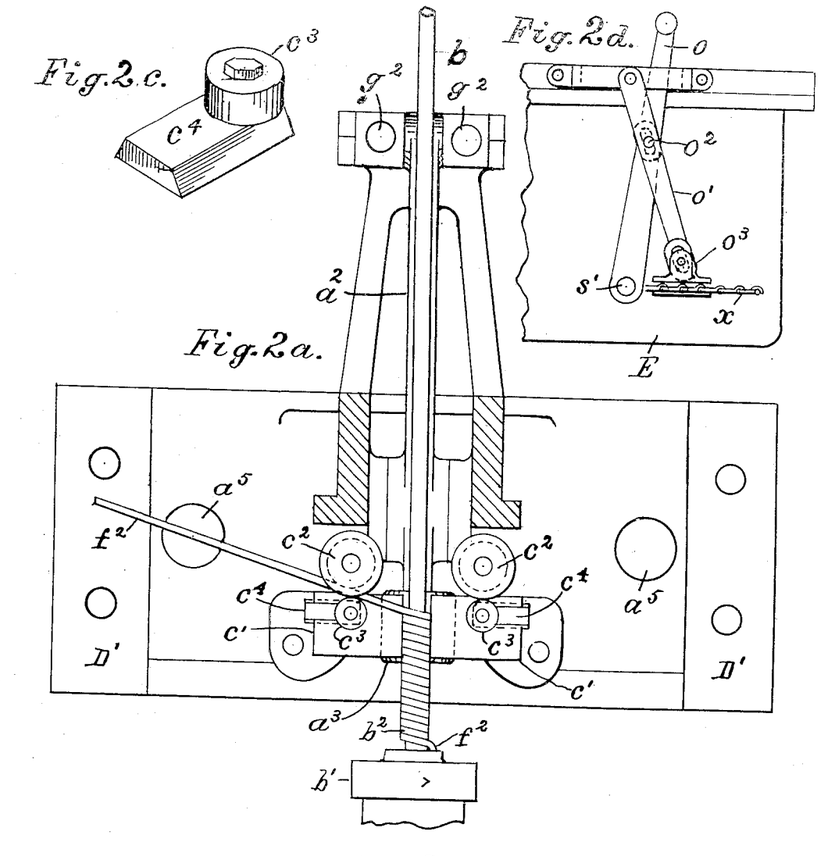

In the present construction, the compression-levers $a$ $a^2$ which carry the compression-rolls $a^3$ are projected from its base D' outward at the end of the machine, in a line with the mandrel $b$, as is clearly shown in Figs. 2 and $2^a$.

These levers are mounted upon the head D to hold the rolls $a^3$ respectively above and below the mandrel.

Figure 2B:
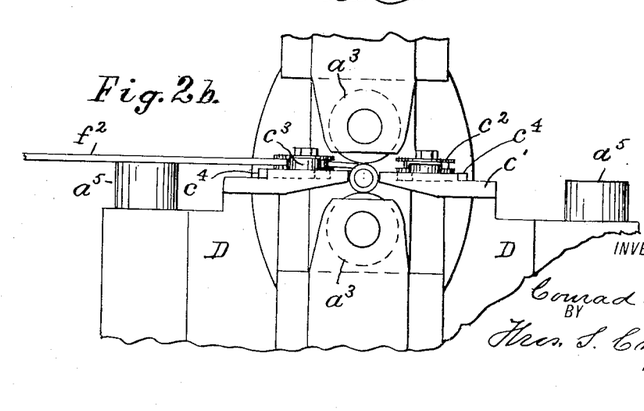

Seats $c'$ are provided upon the base D at each side of the mandrel, as shown in Figs. $2^a$ and $2^b$, and retaining-rolls $c^3$ are journaled upon these feet. At the rear of the rolls $c^3$ guide-rolls $c^2$ are pivoted, and operate with the rolls $c^3$ in guiding the strand or strip of metal $f^2$ at an inclination to the mandrel, upon which it is wound and compressed by the rolls $a^3$. The pressure is secured by right and left-hand screws $g^2$ which crowd the rolls together upon the mandrel when turned by a crank $a^4$. (See Fig. 1.)

In Fig. $2^a$ the strand $f^2$ is shown guided to the mandrel from the left-hand side of the same, while in Fig. 2 it is shown approaching the mandrel from the right-hand side.

To readily insert the strands in the grooves of the rolls $c^2$ guide-rolls $c^3$ are mounted on removable slides $c^4$, which slides support the retaining-rolls close to the edges or flanges of the rolls $c^2$ thus confining the strands between such flanges. The slides $c^4$ are dovetailed into the seats $c'$ at opposite sides of the mandrel, and can be readily slipped out of their grooves when fitting the strands to the mandrel and the chuck and then replaced.

In Fig. $2^a$ the end of the strand $f^2$ is shown bent to enter a hole $f^3$ in the nose of the chuck, which holds the strand firmly while it is being wound upon the mandrel.

An anvil $a^5$ is provided in the path of the strand at each side of the base, upon which the strand may be severed with a cold-chisel when the winding is completed.

The fixtures for guiding the strand are thus duplicated at opposite sides of the mandrel, so that the strand may be wound with right or left-hand coils $b^2$ as may be desired.

The chuck-driving carriage has a casing E provided with wheels E' to run upon the rails A, and an electric motor F is mounted on top of the casing and its arbor connected by a leather or chain-belt F' to a power-shaft G in the lower part of the casing.

The power-shaft is connected detachably, by a friction-clutch J, to the clutch-pulley J'; and all the gearing connected therewith may thus be stopped without arresting the motor.

*Reversing of mandrel.*

Reducing-gears are connected with this shaft to rotate a feed-pinion $e$ and reversing-gears connect the shaft with the chuck $b'$ that operates the mandrel $b$. This chuck is mounted upon a chuck-shaft H upon which a shifting-gear 2 is mounted, and movable by means of a gear-shifter $c$ to reverse the motion of the chuck-shaft. (See Figs. 6 and 7.)

The carrier $d$ for the shifter-fork $d'$ is mounted upon a guide-bar $d^2$ (Fig. 7) and the gear-shifter crank $c$ is mounted upon a shaft $c'$ having an arm $f$ upon the outer side of the casing, with a spring-bolt $g$ fitted to holes $g'$ in the casing to hold the gearing in either of its required positions.

To turn the chuck-shaft in one direction, the power-shaft is provided with a gear 1 to mesh with a shifting-gear 2 upon the chuck-shaft. To turn the chuck-shaft in the opposite direction, the power-shaft is provided with a gear 3 which rotates an intermediate gear 4 adapted to mesh reversibly with the gear 2, as shown in Fig. 6ª.

The shifting of the gear 2 endwise upon the chuck-shaft H operates to change the rotation of the chuck from the right-hand to the left-hand, or vice versa.

Figure 6:
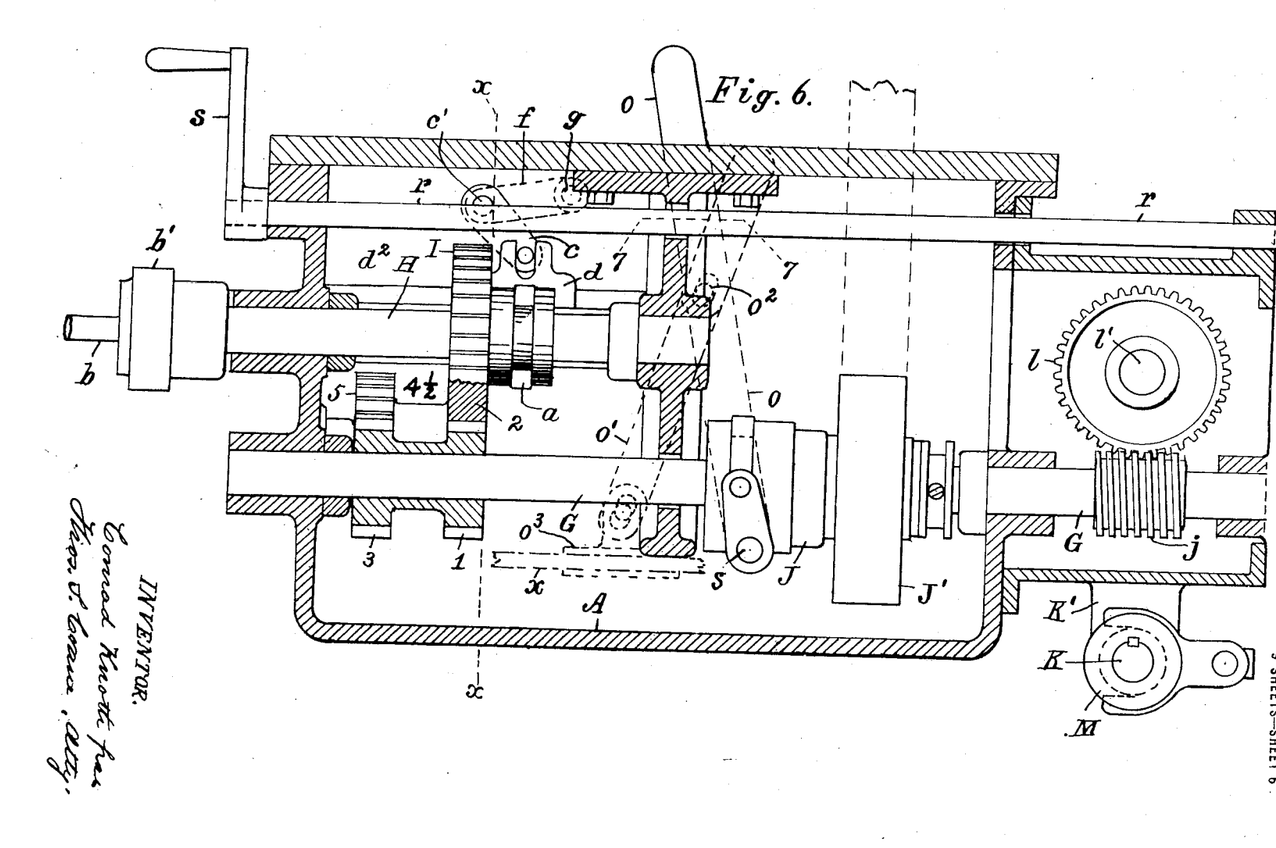
Fig. 6 is a vertical section of the carriage taken on line 6—6 in Fig. 7, with the bridge-bearing in section at the center line; Fig. $6^a$ is a section where hatched, of the carriage and reverse gears on line $x$—$x$ in Fig. 6.
Figure 6A:
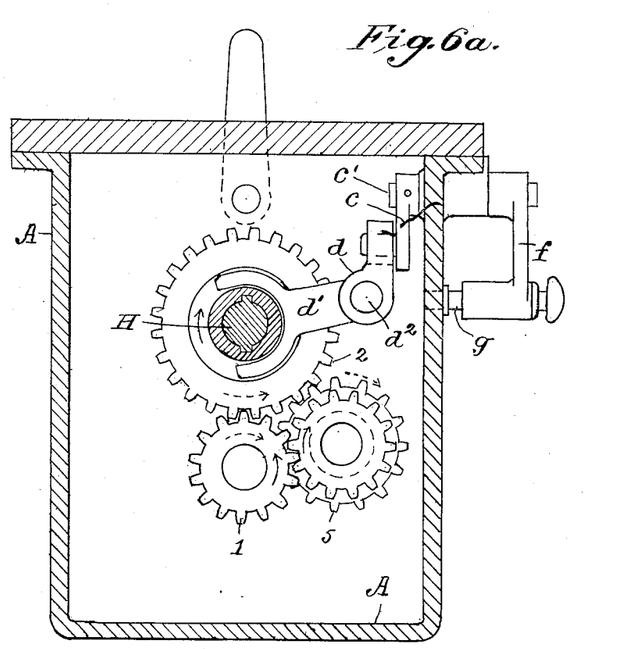
Figure 7:
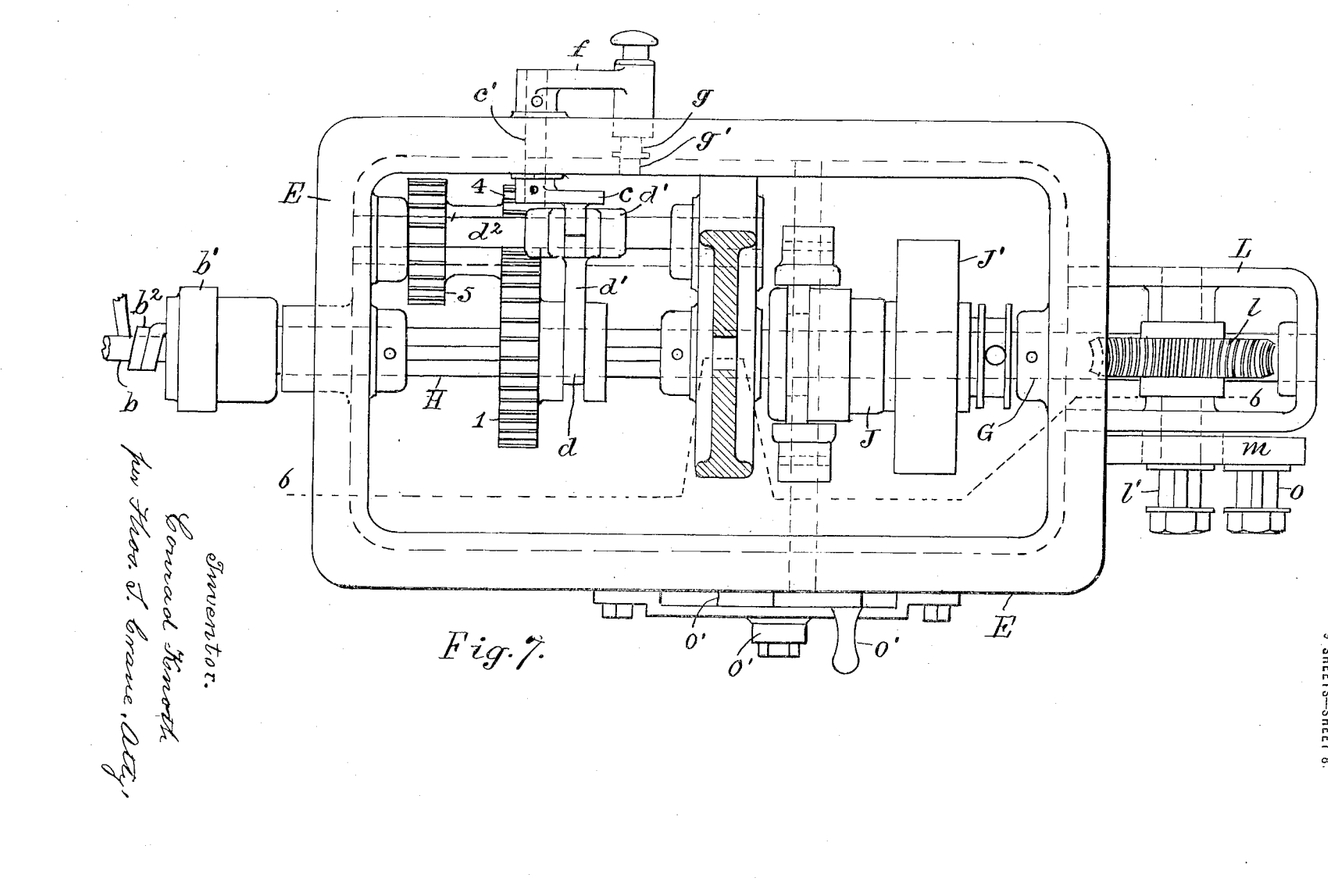
Fig. 7 is a plan of the carriage with the bridge-bearing in section on line 7—7 in Fig. 6, and the top of the casing removed.

It will be understood that the gears 1 and 3 are fastened to the power-shaft and turn continuously with said shaft, but the shifting-gear 2 can be moved to engage either the direct or reversibly-moving pinion, or to stand idly between the two in a space marked 4½ in Fig. 6.

The rotation of the chuck can thus be reversed by moving the arm $f$ and engaging the spring-bolt with a suitable bolt-hole $g'$.

*Carriage-feed.*

A rack $h$ is sustained upon the standards B and legs C parallel with the motion of the carriage, and close to the same to engage a feed-pinion $e$ which is mounted upon a pinion-shaft K fitted to bearings K' upon the carriage.

Figure 8:
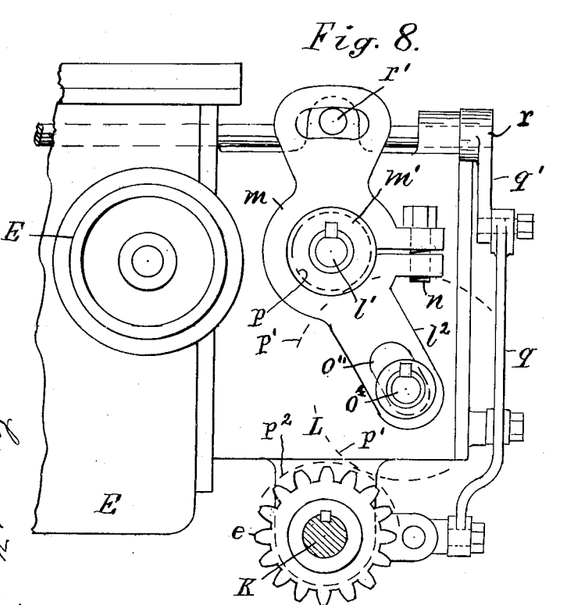
Fig. 8 is a side elevation of the reduction gearing for the carriage-feed with the pinion-shaft in section on line $x^2$—$x^2$ in Fig. 9.
Figure 8A:
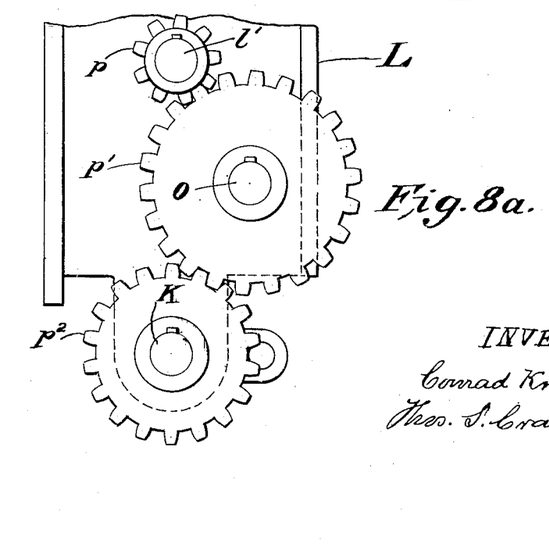
Figure 9:
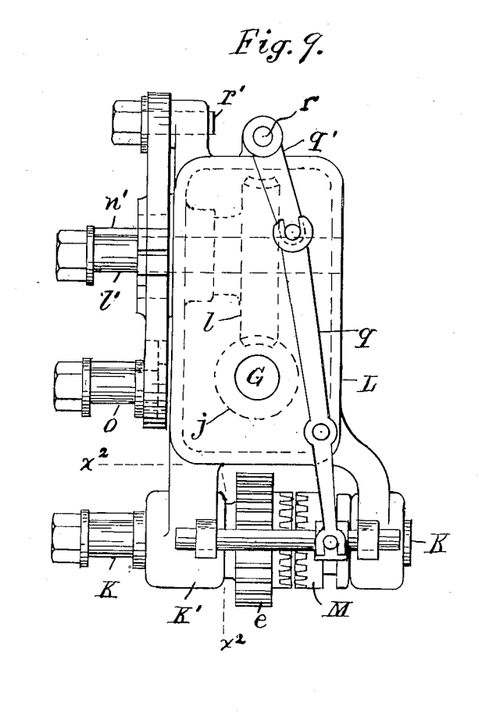
Fig. 9 is an elevation of the same parts viewed from the right-hand end of Fig. 8.

The reduction-gearing, as shown in Figs. 6 to 9 inclusive is mounted upon a housing L at one end of the casing E, and consists of a worm $j$ upon the power-shaft and a worm-wheel $l$ upon a shaft $l'$, which is connected to the pinion-shaft K by change-wheels $p$, $p'$, $p^2$, which are indicated by dotted lines in Figs. 8 and 9, as the showing of these wheels in full lines would conceal their mounting.

A so-called frog $m$ is mounted upon a stationary boss $m'$ around the worm-wheel shaft $l'$, which boss projects from the outer side of the housing L to receive the frog, and to hold it rigidly in an adjusted position when clamped by the bolt $n$.

The arm $l^2$ of the frog carries a gear-stud $o^4$ adjustable in a slot $o''$.

The shaft $l'$, the stud $o^4$ and the pinion-shaft K are provided with similar ends having feathers $n'$ thereon to receive the change-wheels interchangeably, which connect the worm-wheel shaft with the feed-shaft.

The change-wheels are indicated by the dotted lines $p$, $p'$ and $p^2$ in Fig. 8, and the adjustability of the stud $o^4$ in the arm of the frog permits the desired changes to be made in the speed of the carriage-feed, by varying the rotations of the pinion and the consequent feed of the carriage, which is thus adjusted to the pitch of the strand on the mandrel.

A bolt $r'$ serves as well as the bolt $n$ to hold the frog firmly in its adjusted position.

With the electric motor running at constant speed, the gearing upon the machine can be instantly stopped, or varied in its speed relative to other parts by changing the wheels which transmit the motion.

That the feed may be stopped instantly when required, the pinion $e$ is fitted to turn loosely upon its shaft K, and the shaft is provided with a clutch M by which the pinion can be clutched to the shaft when desired.

The clutch M is provided with a shifting-lever $q$ pivoted upon the outer end of the casing where it contains the reduction-gear, as shown in Figs. 8 and 9, and the upper end of this lever is jointed to a crank-arm $q'$ upon a shaft $r$. This shaft is shown in Fig. 6 extended lengthwise through the casing and provided with a hand-crank $s$ at its opposite end (nearest the head D) by operating which the feed may be stopped or started instantly, by moving the clutch M to the right or the left.

Means is provided which enables the operator, without moving from the head of the machine, to stop or start the carriage at any point in its travel.

This means consists of a hand-lever $o$ attached to the rock-shaft $s'$ which lever may be manually moved to operate the friction-clutch J, and an auxiliary-lever $o'$ and endless chain $x$ connected to such auxiliary-lever, and operated by hand-wheels $y$ at the head of the machine, by which the operator can move the lever $o$ to open or close the friction-clutch without leaving his station.

This chain $x^2$ is carried over pulleys $x'$ at the ends of the frame, and the shaft of the pulley $x'$ nearest the head D has its ends projected outside of the frame, and furnished each with a hand-wheel $y$ by which the chain can be moved.

The hand-lever $o$ is attached at the bottom to the rock-shaft $s'$ which governs the clutch J.

The auxiliary lever $o'$ is pivoted to the casing at the top and extends diagonally across the lever $o$ to which it is connected by a sliding joint $o^2$. (See Fig. 2ᵈ.)

The lower end of this lever $o'$ is attached by a shoe $o^3$ to the chain $x$, and when the carriage is moving normally upon the rails the lever $o'$ drags the chain with it, thus slowly turning the pulley $x'$ and the hand-wheels $y$.

Whenever it is desired to stop the carriage, the hand-wheel is turned by the operator to move the lever $o'$ which, through the joint $o^2$, actuates the lever $o$ and retracts the clutch from the pulley J.

The hand-lever $o$ enables the operator to stop or start the carriage when beside it, and the hand-wheels $y$ enable him to exert the same control when standing at the head of the machine, which thus enables him to supervise the winding constantly, and to stop the carriage and all its mechanism whenever an emergency arises.

Mandrel steady-rest.

With relatively small mandrels the weight of the mandrel and its coils causes it to sag and vibrate between its ends as it lengthens, and a steady-rest $t$ is therefore provided to follow the movements of the carriage at one-half the speed of the same, which maintains the steady-rest in the middle of the space between the winding-head and the mandrel-chuck, whatever their distance apart.

The steady-rest is hinged to a foot-plate N by a rod $u$, which is fitted to bearings $u'$ upon the foot-plate, by which rod it is held in an operative position when supporting the coils and the mandrel, and provision is made by which it tips downwardly when moved close to the winding-head; so that the chuck may pass over it in engaging the mandrel with the first end of the strand.

Figures 3A, 3B:
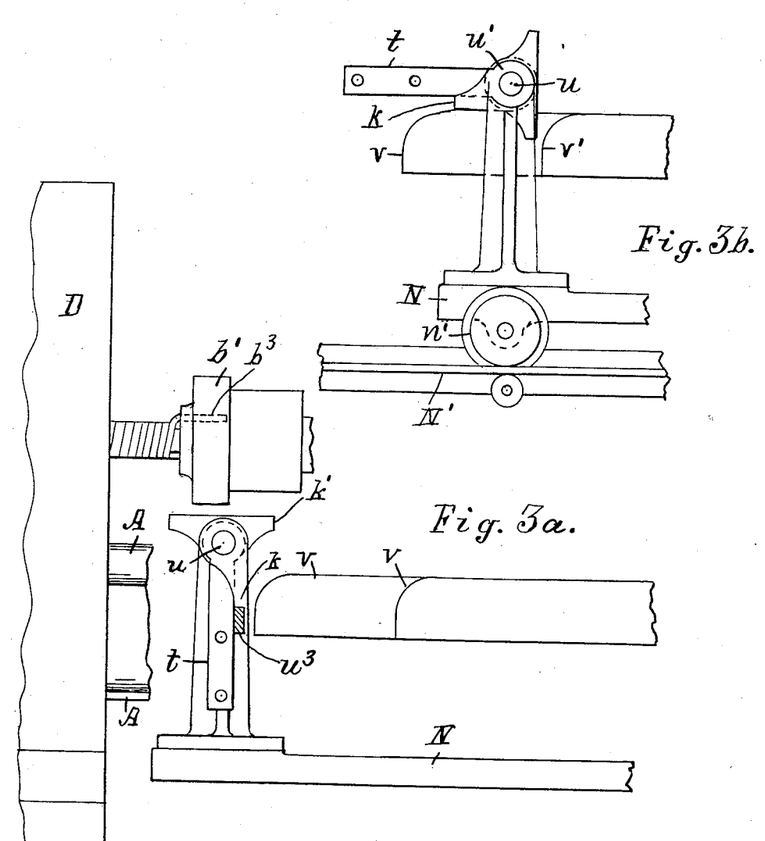

Coil-springs $u^2$ are applied to the rod $u$ and the bearing $u'$, and operate normally to throw the steady-rest downward against a stop $u^3$ upon the foot-plate as shown in Fig. 3$^a$ the steady-rest has changeable lining-pieces $t'$ to fit coils of different sizes.

The pivoted rod of the steady-rest is provided at its ends with dogs $k, k'$, which operate with stationary bars $v, v'$ upon the rails A to raise the steady-rest to its operative position when the chuck has withdrawn from the head D.

Figures 4, 5:
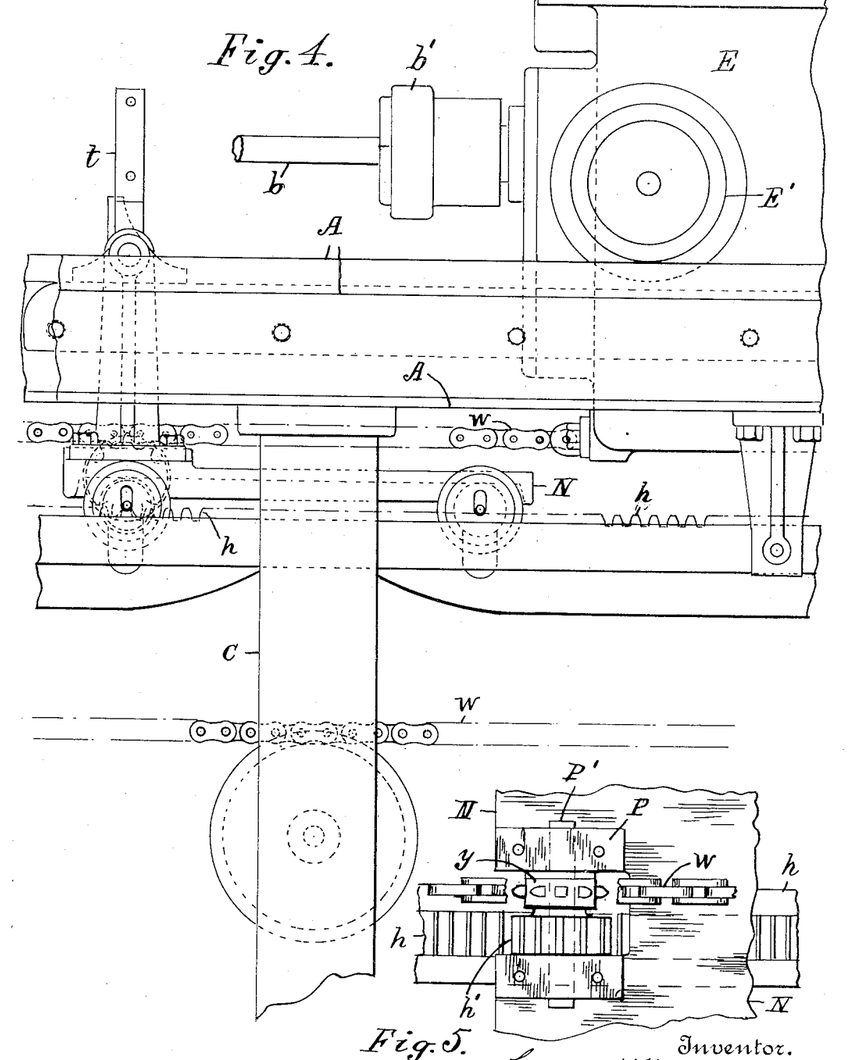
Fig. 4 is a side elevation of the parts connected with the steady-rest.
Fig. 5 is a plan of the gearing which moves the steady-rest at one-half the speed of the carriage.

A chain $w$ is carried over guide-pulleys $w'$ at opposite ends of the machine, and the opposite ends of the upper member of the chain are attached to the front and rear ends of the carriage, as shown in Fig. 1, and at the left-hand end of the casing in Fig. 4. The chain thus moves lengthwise of the frame at the same rate and direction as the carriage.

This chain is provided to move the steady-rest to and from the winding-head at half the speed of the carriage so as to always stand midway between the winding-head and the carriage.

The rack $h$ is made to give a reduced motion to the steady-rest by engagement with a pinion $h'$ journaled upon the foot-plate N by an arbor $p'$, (see Figs. 3, 4 and 5), which is the direct means to move the foot-plate.

A sprocket-wheel $y'$ is attached to the arbor and meshed with the chain $w$ which propels the carriage.

The movement of the chain $w$ with the carriage causes it to rotate the sprocket-wheel $y$ and turn the pinion $h'$ in the rack-teeth. The effect is to advance the arbor $p'$ and foot-plate N at one-half the speed of the carriage; just as a roller placed under a heavy box to lessen the friction moves only half as far as the box.

The parts are adjusted so that the steady-rest always stands in the middle of the space between the carriage and the head D, and it is turned down out of the way when the carriage moves up to the head to first engage the mandrel.

The mandrel does not need the support of the steady-rest until the chuck has moved a considerable distance from the winding-head.

The motions of the steady-rest are reversed when the carriage advances toward the winding-head, as the dogs in such case slip successively from the guide-bars $v, v'$, and the springs $u^2$ turn the steady-rest downward against the stop $u^3$.

Guide-bars $b, b'$ are attached to the inner sides of the rails A, with their ends in position to successively push the dogs upward and turn the steady-rest in the desired manner.

When the steady-rest is turned downward as shown in Fig. 3$^a$, and when the foot-plate N moves away from the winding-head D, as shown in Fig. 1, the dog $k$ is intercepted first by the guide-bar $v$ which turns the steady-rest half way up to its operative position as shown in Fig. 3$^b$.

No mere contact of the dog with the guide-bar could turn the rod $u$ more than one-quarter of a revolution as shown in Fig. 3$^b$, and the guide-bar $v'$ is therefore provided upon the opposite side of the frame to operate with the other dog $k'$, to give the steady-rest another one-quarter turn as shown in Figs. 3 and 4, which brings it in position to support the mandrel.

Fig. 3$^b$ shows the steady-rest raised one-half way to its operative position, and the dog $k$ in position to engage with the guide-bars $v'$ and turn the steady-rest to its working position shown in Fig. 4.

The steady-rest requires no attention upon the part of the operator, but is automatically lowered out of the way until its services are required, and it is then raised into a working position where it supports the extended mandrel.

The various attachments which have been described above enable one machine to wind either right-hand or left-hand rolls, and enables the operator, from his position near the winding-head, to control substantially all the movements of the mechanism involved in the winding operation.

Having thus set forth the nature of the invention what is claimed herein is:

1. In a machine for winding a strip, into a spirally wound roll, the combination, with a suitable bed and means for moving a mandrel lengthwise over the same, of a head having compression-rolls to bend the strip upon the mandrel, and compression-levers extended backward from such rolls in a line with the mandrel, thus leaving the compression-rolls accessible at either side of the mandrel.

2. In a roll-winding machine of the class described, the combination, with a suitable bed and means for moving a mandrel lengthwise over the same, of a head having compression-rolls with clear space at both sides of the same for introducing the strip to the rolls, and guides arranged at both sides of the mandrel to guide the strand at opposite inclinations to the path of the mandrel for winding either right-hand or left-hand coils.

3. A roll-winding machine having a bed with a roll-winding head at one end, a carriage movable lengthwise upon the bed, a motor on the carriage with gearing for rotating the mandrel, in opposite directions, gearing connected with the motor for propelling the carriage upon the bed, and manually operated mechanism for shifting the carriage upon the bed at pleasure.

4. A roll-winding machine having a bed with a roll-winding head at one end, a carriage movable lengthwise upon the bed, a mandrel rotatable thereon, a motor and gearing for rotating the mandrel, a pinion upon the carriage, and a series of teeth fixed upon the bed to engage the pinion, and gearing including change-wheels connecting the motor with the said pinion.

5. A roll-winding machine constructed according to claim 4 and having the pinion-shaft continuously rotated, and a clutch upon such shaft with hand-lever to operate the same for connecting the pinion to the rotating shaft at pleasure.

6. A roll-winding machine having a bed with a roll-winding head at one end, a carriage movable lengthwise upon the bed, a motor and gearing upon the carriage for rotating the mandrel at a relatively high speed, a pinion-shaft, and pinion upon the carriage with a series of teeth upon the bed to engage the same, the pinion-shaft being connected with the motor by worm-gearing and change-wheels, and means provided with a clutch to engage the pinion with the pinion-shaft at pleasure.

7. A roll-winding machine having a bed with rolls at opposite sides and a roll-winding head at one end, a gear-casing with wheels fitted to the said rails, a mandrel chuck rotatable upon the casing, an electric motor mounted upon the casing with gearing to rotate the chuck, and gearing connected with the electric motor to propel the carriage upon the said rails.

8. A roll-winding machine having a bed with a roll-winding head at one end, a carriage movable lengthwise upon the bed, a mandrel rotatable thereon, a motor and gearing for rotating the mandrel, a pinion upon the carriage and stationary rack upon the bed to engage the same, and reduction gearing connecting the motor with the pinion.

9. A roll-winding machine having a bed with a roll-winding head at one end, a carriage movable lengthwise upon the bed to and from the said head and provided with a rotatable mandrel chuck, and a steady-rest for the wound coils movable with the carriage at one-half its rate of speed to and from the winding-head, being thus located midway between the winding-head and the carriage in all positions of the carriage.

10. A roll-winding machine having a bed with a roll-winding head at one end, a carriage movable lengthwise upon the bed to and from the said head and provided with a rotatable mandrel chuck, a steady-rest to loosely embrace the wound coils and movable to and from the winding-head at one-half the speed of the carriage, and having a lining changeable to suit wound coils of various diameters.

11. In a roll-winding machine, the combination, with a winding-head and a carriage movable to and from the same to extend the coils upon a mandrel, of a steady-rest with a foot-plate to move the same to and from the winding-head and the steady-rest hinged upon the foot-plate to turn upward or downward, and means upon the frame of the machine for turning the steady-rest downwardly as it approaches the winding-head and elevating it into working position when withdrawn from such head.

12. In a roll-winding machine, the combination, with a winding-head and a carriage movable to and from the same, of a steady-rest with a foot-plate to move the same to and from the winding head, the steady-rest having a hinge-rod journaled upon the foot-plate, with dogs at its opposite ends, and guide-bars upon the frame of the machine to operate said dogs and turn the steady-rest progressively from an inoperative to an operative position.

In testimony whereof I have hereunto set my hand.

CONRAD KNOTH.